United States Patent
Baker et al.

(10) Patent No.: US 10,909,092 B2
(45) Date of Patent: Feb. 2, 2021

(54) AUTOMATED DATABASE CREATION

(71) Applicant: salesforce.com, inc., San Francisco, CA (US)

(72) Inventors: Gary J. Baker, Zephyr Cove, NV (US); Steven Tamm, San Francisco, CA (US); Nathaniel Wyatt, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 357 days.

(21) Appl. No.: 16/024,689

(22) Filed: Jun. 29, 2018

(65) Prior Publication Data
US 2020/0004849 A1 Jan. 2, 2020

(51) Int. Cl.
*G06F 16/21* (2019.01)
*G06F 8/71* (2018.01)
*G06F 8/41* (2018.01)
*G06F 9/445* (2018.01)

(52) U.S. Cl.
CPC .......... *G06F 16/212* (2019.01); *G06F 8/41* (2013.01); *G06F 8/71* (2013.01); *G06F 9/44505* (2013.01)

(58) Field of Classification Search
CPC .. G06F 16/212; G06F 16/252; G06F 16/2282; G06F 16/21; G06F 21/554; G06F 16/22; H04L 7/0008
See application file for complete search history.

(56) References Cited

U.S. PATENT DOCUMENTS

| | | | |
|---|---|---|---|
| 2005/0198247 A1* | 9/2005 | Perry | H04L 7/0008 709/223 |
| 2010/0114976 A1* | 5/2010 | Castellanos | G06F 16/22 707/803 |
| 2011/0307519 A1* | 12/2011 | Payzer | G06F 16/252 707/792 |

(Continued)

OTHER PUBLICATIONS

Martin Fowler, "Continuous Integration," ThoughtWorks, last revision May 1, 2006, 14 pages.

*Primary Examiner* — Etienne P Leroux
(74) *Attorney, Agent, or Firm* — Kowert, Hood, Munyon, Rankin & Goetzel, P.C.

(57) ABSTRACT

Techniques are disclosed relating to create a configuration for a database system. In some embodiments, program instructions of a change set for an application are received from a source code management (SCM) repository. In response to the receiving, a build process is performed that includes causing compilation of the received program instructions to produce program instructions executable to run the application. The build process also includes provisioning the configuration with a schema by retrieving a first set of metadata defining the schema and issuing corresponding data definition language (DDL) instructions to create the schema in the configuration. The build process includes provisioning the configuration with data by retrieving a second set of metadata defining the data and issuing corresponding data manipulation language (DML) instructions to insert the data into the configuration and storing the provisioned configuration in a repository as one of multiple configurations associated with multiple received change sets.

20 Claims, 8 Drawing Sheets

(56) References Cited

U.S. PATENT DOCUMENTS

| | | | |
|---|---|---|---|
| 2013/0311446 A1* | 11/2013 | Clifford | G06F 16/212 |
| | | | 707/719 |
| 2016/0357985 A1* | 12/2016 | Wisman | G06F 21/554 |
| 2019/0155930 A1* | 5/2019 | Fender | G06F 16/2282 |
| 2019/0179926 A1* | 6/2019 | Das | G06F 16/21 |

* cited by examiner

AUTOMATED DATABASE CREATION

BACKGROUND

Technical Field

This disclosure relates generally to database systems, and, more specifically, to creating database configurations.

Description of the Related Art

Traditional software development relied on a scheme in which a group of developers would work together to produce occasional, large releases for an application as it is updated over time. Because of the size of these releases, development could be plagued with integration problems as developers attempted to integrate new code with existing code. Modern software development has transitioned to using a continuous integration (CI) scheme in which small, frequent updates are released. For example, software updates may be released several times in a year in contrast to once or twice a year. In many instances, using a CI scheme can simplify the integration process as the delta between updates is smaller and can make identifying and correcting problems much easier. Still further, various tools have been developed to further assist in automating the integration such as code repositories that can track changes, automated build servers that can test and compile code, etc.

Figure 1:
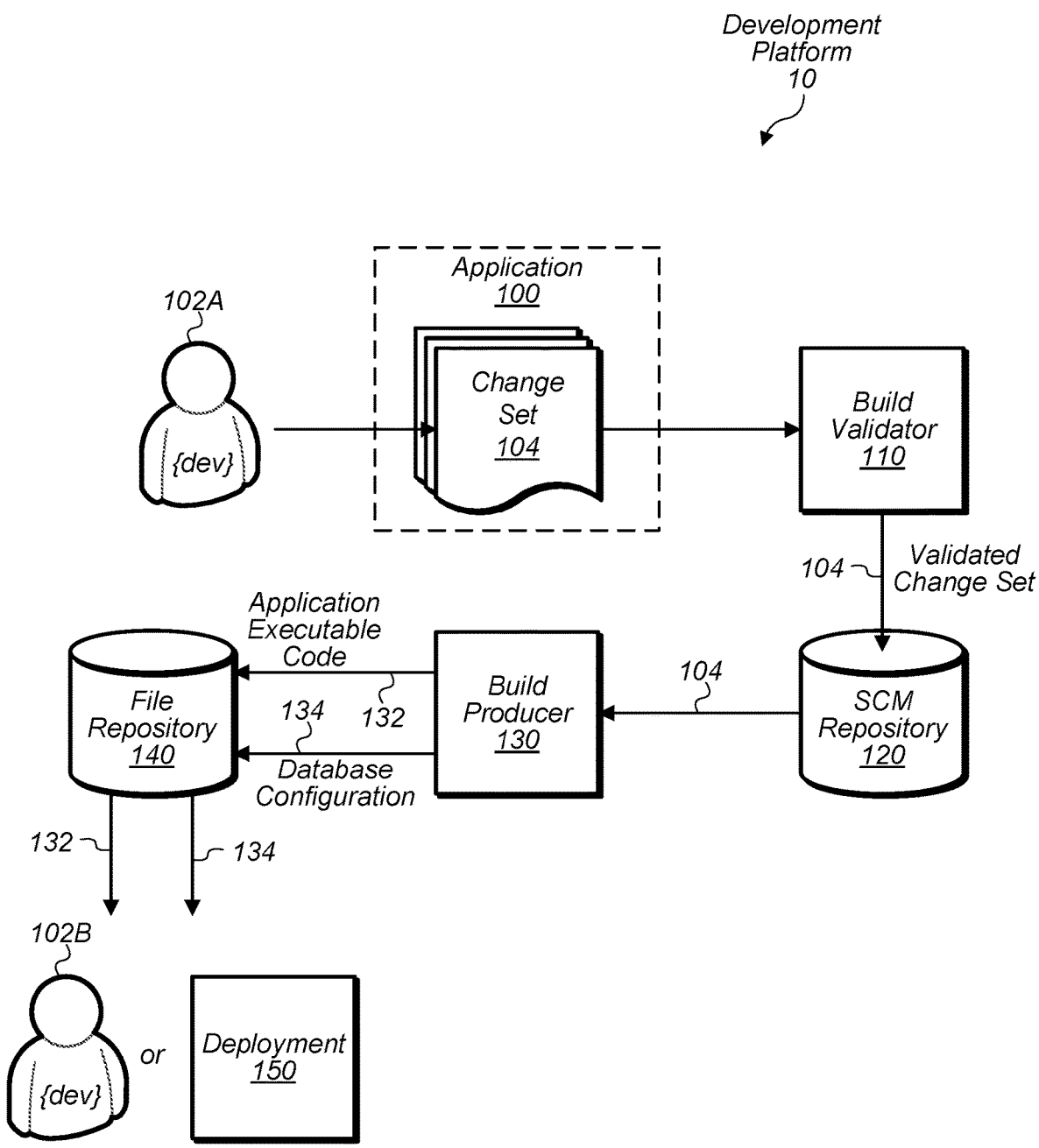
FIG. 1 is a block diagram illustrating one embodiment of a development platform configured to create a configuration of a database system during an application build process.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "temperature circuit configured to measure an internal temperature of a computing system" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a database system may have multiple configurations including a "first" configuration and a "second" configuration. Accordingly, the terms "first" and "second" can be used to refer to any two database configurations. In other words, the "first" and "second" database configurations are not limited to the initial two configurations, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As an application is developed and updated, it can be important to test the application before deploying it. If that application maintains information in a database system, a developer may want to evaluate updates relative to the database system in order to ensure that the updates function correctly. In many instances, however, it may be undesirable to evaluate updates relative to the production database system as the updates could potentially corrupt the application's actual data. Instead, a developer may elect to evaluate updates against a test configuration of the database system that is similar to the deployed/production configuration of the database system. In a CI development scheme in which updates are frequently being made to the application and/or database system, it can be difficult to ensure that a developer has access to the latest configuration of a database system in order to test and evaluate application updates.

The present disclosure describes embodiments in which a development platform integrates creation of a database configuration into the build process of the application. As will be described below in various embodiments, a developer can submit a new set of changes (i.e., a change set) for an application to a source code management (SCM) repository of the development platform. A build producer of the platform may then retrieve the change set and perform a build process that includes, not only compiling program instructions of the change set to produce a build, but also creating a database configuration corresponding to the change set. In some embodiments, creating the configuration may include the build producer creating an empty database configuration and provisioning the configuration with a schema and data by using metadata from the SCM repository defining the schema and/or data and issuing the appropriate instructions to a database system to provision the configuration. In some embodiments, the build producer also places the configuration in a package and provides the package to a repository accessible to developers. A developer wanting the latest database configuration, for example, can then download the corresponding database configuration from the repository and use it for testing and development.

In many instances, integrating creation of a database configuration into the build process can allow a configuration to be created more quickly and efficiently. It can also allow a developer to more easily ensure that he or she is getting a particular version of database configuration associated with a particular change set (e.g., the configuration associated with the latest submitted change set). Still further, in some embodiments, the database configuration may be provisioned with only seed data. As used herein, the term "seed data" is to be interpreted according to understood meaning in the art, which includes the bare minimum data needed by an application to function correctly. In such an embodiment, the database configuration may be substantially smaller than the corresponding production database configuration used by the deployed application.

Turning now to FIG. 1, a block diagram of a development platform 10 is depicted. In the illustrated embodiment, platform 10 includes a build validator 110, SCM repository 120, build producer 130, and file repository 140. In some embodiments, platform 10 may be implemented differently than shown. For example, functionality described with respect to build validator 110 may be implemented by SCM repository 120 and/or build producer 130, SCM repository 120 may implement functionality of file repository 140, elements 110-140 may be implemented on one or more computer systems (not depicted), users other than developers 102 may use functionality of platform 10, etc.

Development platform 10, in various embodiments, facilitates the creation and deployment of applications, such as application 100. In some embodiments, platform 10 provides various services such as providing a user interface for receiving program instructions from a developer 102, providing libraries having program instructions that can be incorporated by into an application, compiling developer code, running various tests, etc. In some embodiments, platform 10 may support implementing a CI pipeline for developing application 100.

Application 100 may correspond to any suitable application, which may access a database system. For example, in one embodiment, application 100 is executable to facilitate customer relationship management (CRM) and may maintain various CRM data in a database system. In various embodiments, a group of developers 102A may periodically modify source code of application 100 and submit new code to platform 10 as changes sets 104. As will be described below with FIG. 2, these change sets 104 may also include updates for the database system. As application 100 is being developed, developers 102 may download executable code 132 of application 100 as well as a database configuration 134 to facilitate testing and development of application 100.

Build validator 110, in various embodiments, is executable to receive a submitted change set 104 and validate the submitted change set 104 by performing a set of tests (e.g., a pre-check) prior to storage in SCM repository 120. These tests may include, for example, an analysis of the program instructions in the change set 104 in order to ensure that they comply with proper syntax. These tests may include various developer-provided tests to ensure a new change set 104 complies a particular set of established rules for application 100. These tests may also include verifying that a particular developer 102A has the authority make changes specified in a given change set 104.

SCM repository 120, in various embodiments, is executable to maintain source code for application 100. Accordingly, repository 120 may merge received source code with existing source code and perform version tracking for submitted change sets 104—thus, repository 120 may also be described as a version control system (VCS). SCM repository 120 may correspond to any suitable repository such as GIT™, BitKeeper, Perforce™, etc. As validated change sets 104 are stored in repository 120, build producer 130 may be triggered to create a corresponding build of application 100.

Build producer 130, in various embodiment, is executable to retrieve program instructions for a submitted change set 104 from repository 120 and facilitate compiling those instructions to produce application executable code 132 for application 100. Accordingly, producer 130 may include various scripts to invoke compilers to compile the code and collect the compiled code 132 for deposit in file repository 140. In some embodiments, build producer 130 may implement various functionality of automated servers such as Travis C I, Jenkins, etc.

In various embodiments, build producer 130 is further executable to create database configurations 134 for a database system accessible to application 100. As noted above and discussed in greater detail below with FIG. 3, this may include instructing a database system to create an empty (i.e., vanilla) database configuration and accessing metadata stored in SCM repository 140 to provision with the database configuration 134 with a schema, which may include creating any tables, triggers, stored procedures, etc. This may further include provisioning the configuration 134 with an initial set of data, which may include only seed data. After provisioning the database configuration 134, build producer 130 may provide the configuration 134 to file repository 140 for storage. In some embodiments, prior to storage, build producer 130 may provide the configuration 134 to a packager executable to combine the files of configuration 134 into a single package for easy download.

File repository 140, in various embodiments, is executable to store application executable code 132 and database configurations 134. As will be described below with FIG. 4, file repository 140 may be accessible to developers 102B, which may download copies of application executable code 132 and copies of database configurations 134 to their computing systems for evaluation and testing. In some embodiments, a developer 102B may also perform further provisioning a configuration 134 such as adding additional data to the configuration 134. In some embodiments, file repository 140 may also provide executable code 132 and/or configuration 134 for deployment 150 after particular code 132 and/or a particular configuration 134 has been sufficiently evaluated.

Figure 2:
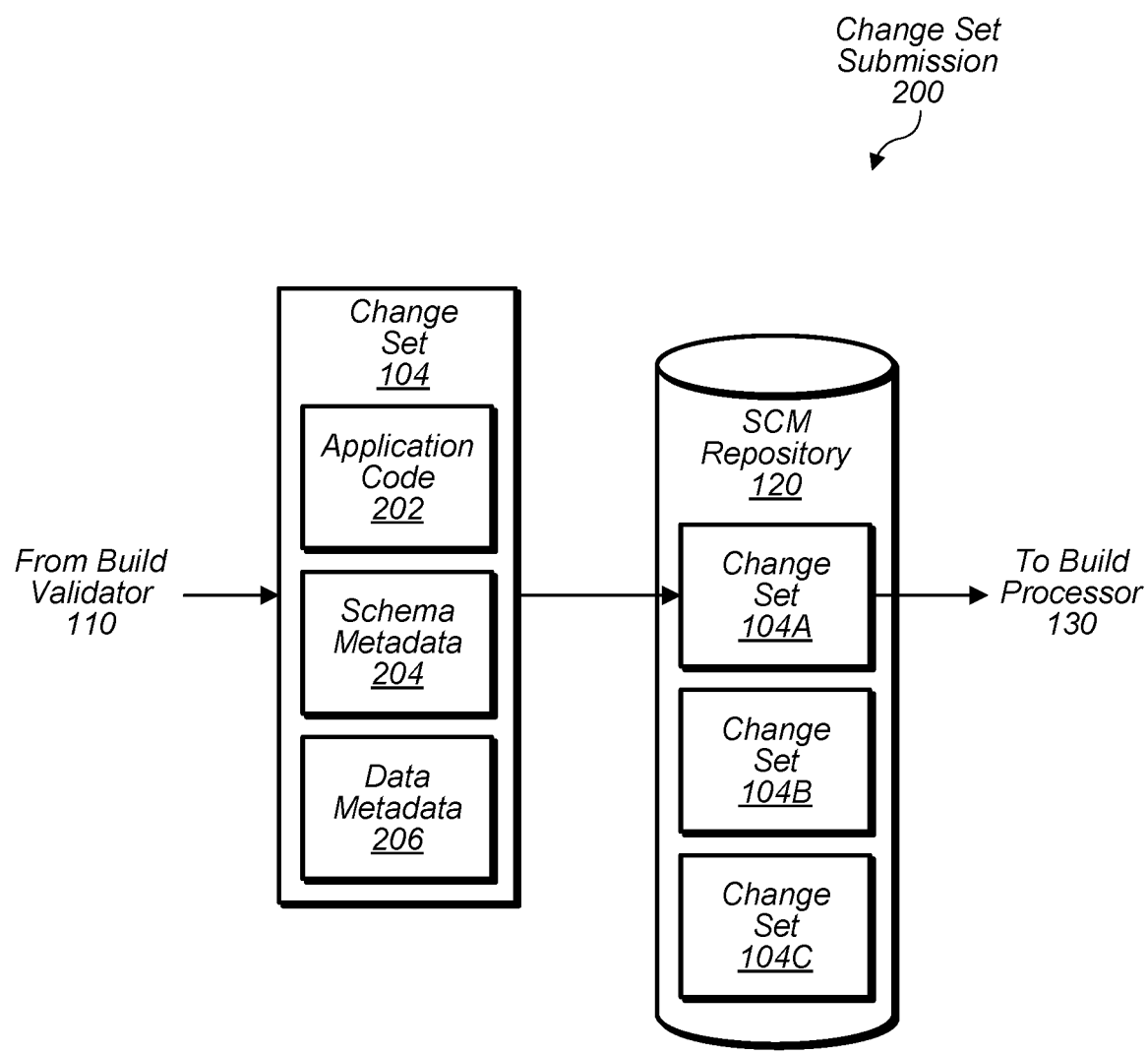
FIG. 2 is a block diagram illustrating one embodiment of a change set submission associated with a build process.

Turning now to FIG. 2, a block diagram of a change set submission 200 is depicted. As shown, SCM repository 120 may include multiple, different change sets 104A-104C. In the illustrated embodiment, a given change set 104 may include application code 202, schema metadata 204, and data metadata 206; however, in some embodiments, a submitted change set 104 may include more (or less) elements than depicted.

Application code 202, in various embodiments, is a set of program instructions written by one or more developer 102 to implement application 100. Application code 202 may be written in any suitable language such as Apex™, Java™, C++, etc. As will be described below with respect to FIG. 3, application code 202 may be provided by build producer 130 to a compiler to produce executable code 132 for application 100.

Schema metadata 204, in various embodiments, is a first type of metadata that is usable to provision a database configuration 134 with a database schema. Accordingly, metadata 204 may define tables including table names, column elements, data types, etc. Metadata 204 may also define indexes, triggers, unions, procedures, etc. Metadata 204 may be expressed in any suitable manner. For example, in some embodiments, metadata 204 includes a collection of JavaScript Object Notation (JSON) statements defining various ones of these structures to be instantiated in database configuration 134. In other embodiments, metadata 204 may include XML, data definition language (DDL) instructions, etc. As will be described below with FIG. 3, build producer 130 may analyze metadata 204 and translate it to a corresponding set of DDL instructions to provision a database configuration 134.

Data metadata 206, in various embodiments, is a second type of metadata that is usable to provision a database configuration 134 with an initial set of data. Similar to metadata 204, metadata 206 may define data in any suitable manner such as using JSON, XML, etc. Accordingly, in one embodiment, metadata 206 is a collection of data manipulation language (DML) instructions. In some embodiments, metadata 206 defines seed data for application 100. For example, in some embodiments in which the database system is a multi-tenant database system, the seed data may include data for a single tenant, which may be skeleton tenant. The seed data may also include various configuration data for application 100, for example.

Figure 3:
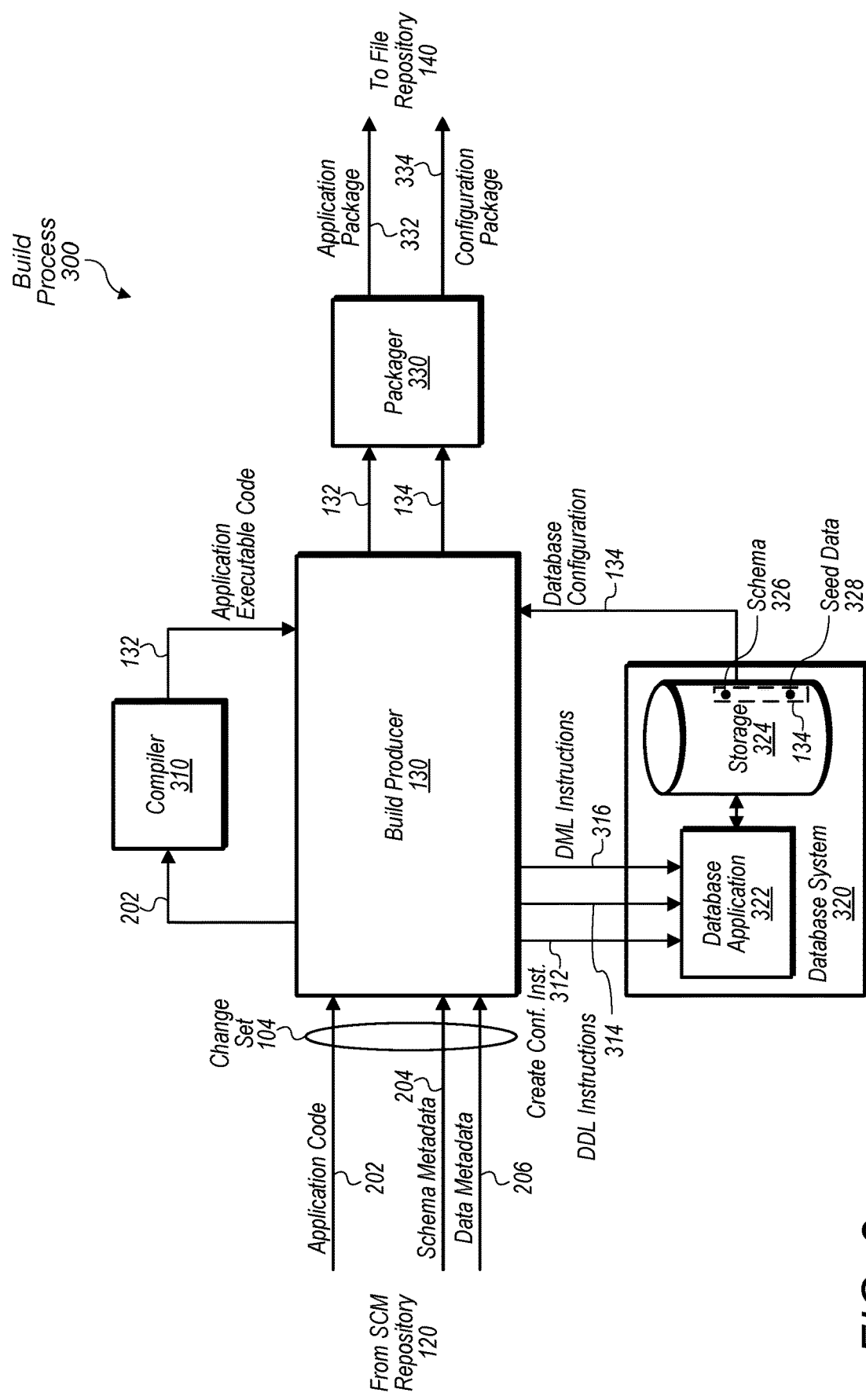
FIG. 3 is a block diagram illustrating one embodiment of a build process to create a database configuration.

Turning now to FIG. 3, a block diagram of a build process 300 is depicted. As shown, build producer 130 may interact with a compiler 310, database system 320, and packager 330. In the illustrated embodiment, database system 320 includes a database application 322 and a storage 324. In some embodiments, build process 300 may be implemented differently than shown.

In some embodiments, build producer 130 continually monitors SCM repository 120 for submitted change sets 104. In response to detecting a submitted change set 104 (or a group of sets 104 submitted within an interval), build producer 130 may retrieve the change set 104 (or change sets 104) and distribute the source code 202 to compiler 310. Build producer 130 may also analyze metadata 204 and 206 and issue the appropriate instructions 312-316 to database system 320 to create a database configuration 134.

Compiler 310, in various embodiments, is executable to produce executable code 132 from source code 210 for a given build. Compiler 310 may corresponding to any suitable compiler such ones supporting Apex™, Java™, C++, etc. Once code 202 has been compiled, build producer 130 may obtain the executable code 132 from compiler 310 and supply it to packager 330.

Database system 320, in various embodiments, is configured to create a database configuration 134 and may be distinct from the database system maintain application 100's production database. Database system 320 may correspond to any suitable database system such as Postgres™, Oracle™, MySQL™, etc. As noted above, database system 320 may include database application 322 executable to facilitate access to storage 324 and perform various instructions such as instructions 312-316. In response to retrieving a change set 104, build producer 130 may initially issue an instruction 312 to application 322 to create an empty database configuration 134 in storage 324. For example, in some embodiments in which Postgres™ is used, instructions 312 may include invoking Postgres's "createdb" command. In some embodiments, instructions 312 may include an instruction to create an initial user. In various embodiments, build producer 130 parses schema metadata 204 to identify one or more schema elements (e.g., tables, indexes, triggers, unions, procedures, etc.) defined by metadata 204 and determine a corresponding set of DDL instructions 314 to create the elements in the database configuration 134. Build producer 130 may then issue the DDL instructions 314 to database application 322 to provision database configuration 134 with a corresponding schema 326. For example, in embodiments in which Postgres™ is used, DDL instructions 314 may include multiple CREATE TABLE instructions such as "CREATE TABLE table_name (column1 datatype, column2 datatype, . . . , PRIMARY KEY( . . . ))." In various embodiments, build producer 130 also parses data metadata 206 to determine a corresponding set of DML instructions 316 to issue to database application 322 to provision configuration 134 with data, which may be seed data 328. For example, in some embodiments in which Postgres™ is used, data metadata 206 may include DML instructions 316 such as multiple INSERT instructions such as "INSERT INTO table_name ( . . . ) VALUES ( . . . )" In such an embodiment, build producer 130 may read the DML instructions 316 and issue them to database application 322. Once a database configuration 134 has been created and provisioned, build producer 130 may the configuration 134 to packager 330.

Packager 330, in various embodiments, is executable to assemble application executable code 132 into an application package 332 and a database configuration 134 into configuration package 334, which may provide an easy way to download a single file that include several files organized within one or more directories. In some embodiments, packages 332 and 334 may also use compression to reduce the downloaded sizes of code 132 and a configuration 134. Packager 330 may use any suitable packing scheme such as tar, zip, bzip2, jar, rar, etc. As shown, packages 332 and 334 may be provided to file repository 140 for storage.

Figure 4:
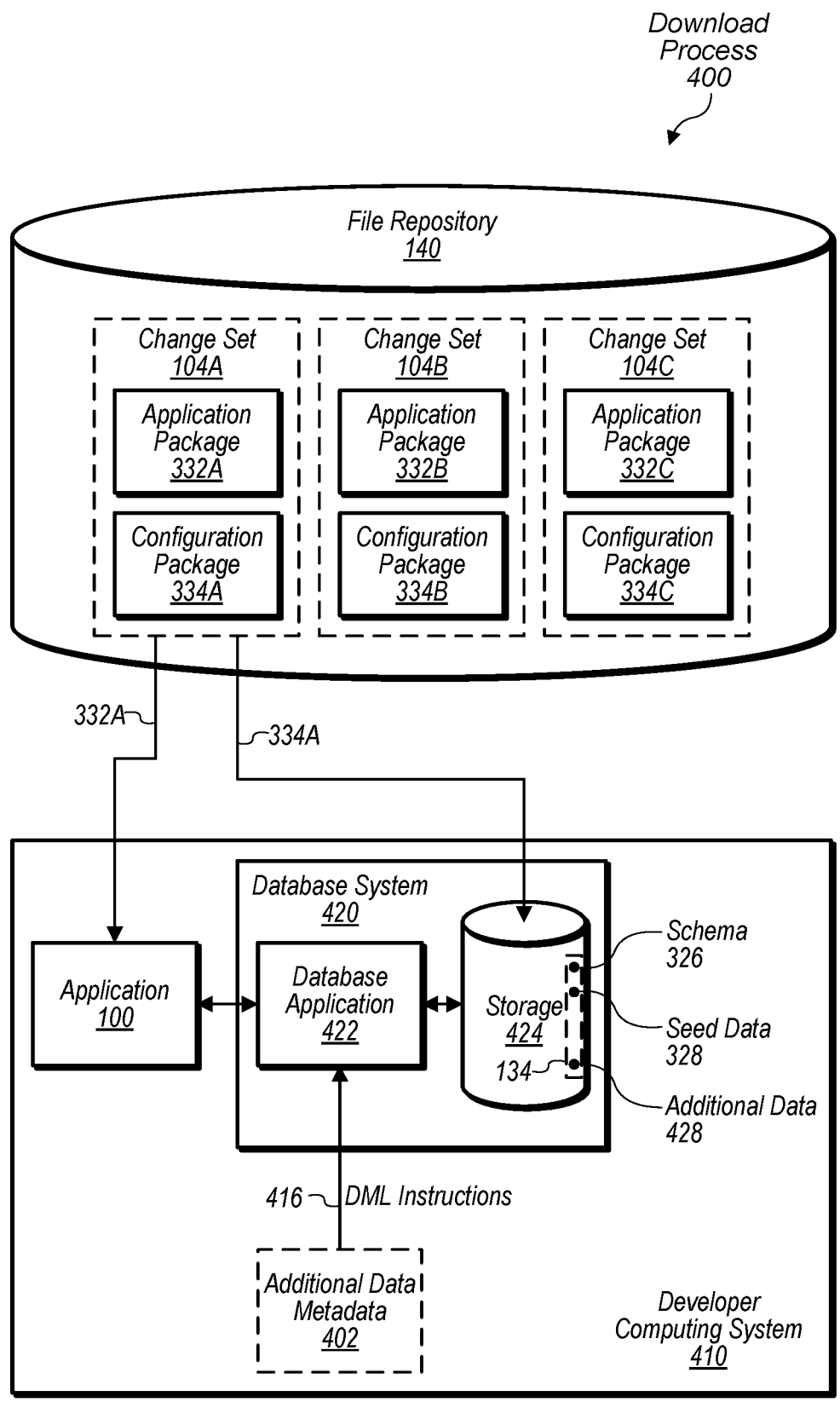
FIG. 4 is a block diagram illustrating one embodiment of a download process to obtain a created database configuration.

Turning now to FIG. 4, a block diagram of a download process 400 is depicted. As shown, file repository 140 may include a collection of different application packages 322A-C and different configuration packages 334A-C. In the illustrated embodiment, each application package 332 and configuration package 334 corresponds to a respective change set 104. Accordingly, packages 332A and 334A, for example, may be created in response to receiving change set 104A having its own metadata 204 and 206 and may differ from packages 332B and 334 generated based on a change set 104B. In some embodiments, an application package 332 and configuration package 334 may also be created in response to a group of change sets 104 submitted within a particular interval—e.g., within close proximity.

In various embodiments, a developer 102 can download packages 332 and 334 associated with a particular change set 104 (e.g., packages 332A and 334A) at his or her computing system 410. As shown, application package 332A may be unpackaged and expanded at computing system 410 to obtain an executable instance of application 100. Configuration package 334A may be unpackaged and expanded into storage 424 of a local database system 420 in order to obtain a database configuration 134 having a schema 326 and seed data 328. In the illustrated embodiment, database system 420 also includes a database application 422, which, in some embodiments, may be downloaded from file repository 140 as well (or obtained from some other source in other embodiments).

Once packages 332 have been downloaded and unpackaged, computing system 410 may execute application 100, which may interface with database application 422 to access data 328 maintained in storage 424. In some embodiments, additional data metadata 402 may be accessed by computing system 410 to issue DML instructions 416 to database application 422 in order to provision configuration 134 with additional data 428. For example, a developer 102 testing a particular feature of application 100 may want to add data 428 that is used by that feature. In some embodiments, data metadata 402 is implemented in a similar manner as data metadata 206 discussed above.

Figure 5A:
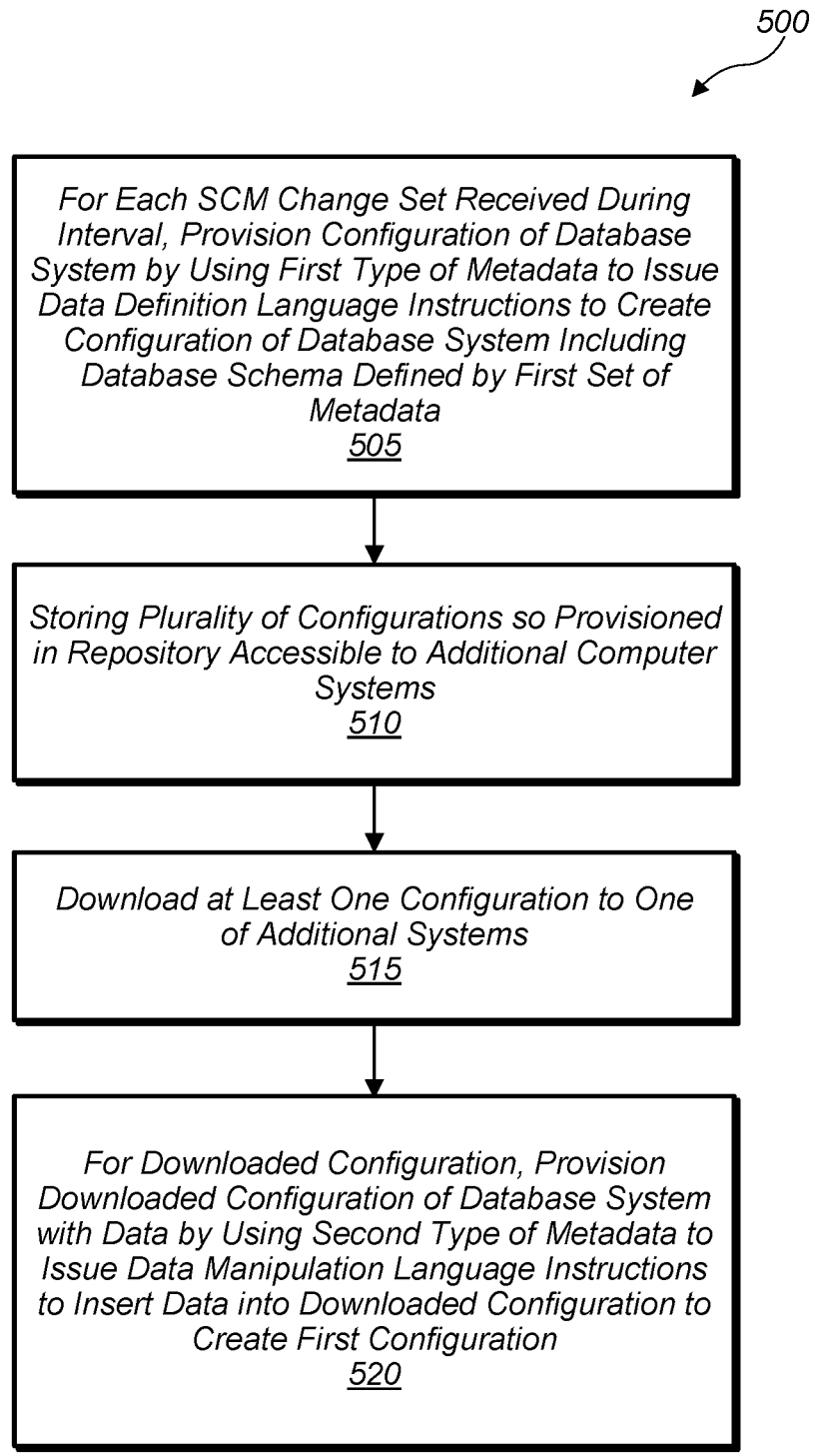
FIGS. 5A-5C are flow diagrams illustrating embodiments of methods for creating database configuration.

Turning now to FIG. 5A, a flow diagram of a method 500 for creating a first configuration of a database system. In various embodiments, method 500 is performed such that configurations of the database system differ based on source code management (SCM) change sets (e.g., change sets 104), a first type of metadata (e.g., schema metadata 204) associated with a database schema, and a second type of metadata (e.g., metadata 206 and/or 402) capable of causing a computer system to insert data into a configuration. In some embodiments, method 500 is performed by one or more computing systems implementing development platform 10.

In step 505, for each of the SCM change sets received by a first computer system during an interval, provisioning, through use of the first computer system, a configuration (e.g., configuration 134) of the database system by using the first type of metadata to issue data definition language instructions (e.g., DDL instructions 314) to create the configuration of the database system including the database schema defined by the first type of metadata. In some embodiments, during a build process of an application (e.g., application 100) executable to access the database system, the computer system invokes a compiler (e.g., compiler 310) to compile program instructions of a received change set to produce executable program instructions (e.g., application executable code 132) of the application, and the provisioning is performed during the build process of the application. In some embodiments, the provision includes using metadata (e.g., metadata 206) defining a set of seed data to issue data manipulation language instructions (e.g., DML instructions 316) to insert the set of seed data into the configuration of the database system. In some embodiments, step 505 includes retrieving the first type of metadata from an SCM repository (e.g., repository 120) that includes the received SCM change sets, translating the first type of metadata into the data definition language instructions, and issuing the data definition language instructions to a database application executable to instantiate the database schema in the configuration.

In step 510, a plurality of the configurations so provisioned are stored in a repository (e.g., file repository 140) accessible to additional computer systems (e.g., a developer computing system 410). In some embodiments, the plurality of configuration are stored in a plurality of compressed packages (e.g., packages 334) accessible to the additional computer systems.

In step 515, at least one of the configurations is downloaded to one of the additional computer systems. In some embodiments, step 515 includes downloading the executable program instructions of the application.

In step 520, the downloaded configuration of the database system is provisioned, at the additional computer system with the data by using the second type of metadata to issue data manipulation language instructions (e.g., DML instructions 414) to insert the data into the downloaded configuration to create the first configuration.

Figure 5B:
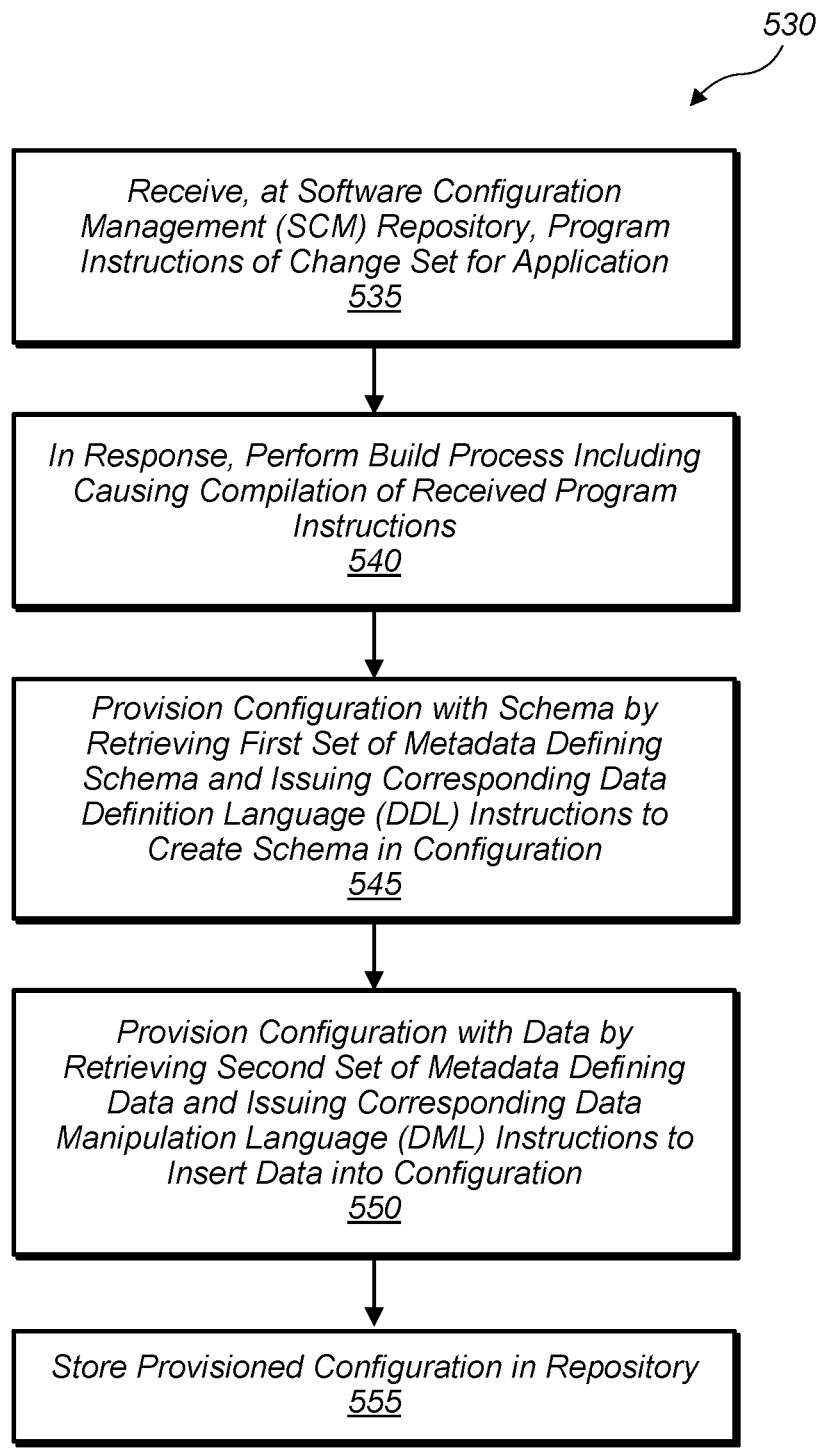

Turning now to FIG. 5B, a flow diagram of a method 530 for creating a configuration for a database system during a build process of an application associated with the database system is depicted. In some embodiments, method 530 is performed by a computing system executing a build producer such as build producer 130.

In step 535, program instructions (e.g., application code 202) of a change set (e.g., change set 104) for the application (e.g., application 100) are received from a source code management (SCM) repository (e.g., repository 120).

In step 540, in response to the receiving, the build process is performed including causing compilation of the received program instructions to produce program instructions executable (e.g., application executable code 132) to run the application.

In step 545, the build process includes provisioning the configuration (e.g., configuration 134) with a schema (e.g., schema 326) by retrieving a first set of metadata (e.g., schema metadata 204) defining the schema and issuing corresponding data definition language (DDL) instructions (e.g., DDL instructions 314) to create the schema in the configuration. In some embodiments, step 545 includes instructing a database application (e.g., database application 322) of the database system to instantiate an empty configuration. In some embodiments, step 545 includes parsing the retrieved first set of metadata to identify one or more tables defined by the first set of metadata, determining a corresponding set of DDL instructions to create the one or more tables, and issuing the set of DDL to instructions to the database application to cause the database application to create the tables in the instantiated configuration.

In step 550, the build process includes provisioning the configuration with data (e.g., seed data 328) by retrieving a second set of metadata (e.g., data metadata 206) defining the data and issuing corresponding data manipulation language (DML) instructions (e.g., DML instructions 316) to insert the data into the configuration. In some embodiments, the data defined by the second set of metadata is an initial set of seed data to be used by the application. In some embodiments, step 550 includes reading a set of DML instructions from the second set of metadata and issuing the set of DML instructions to the database application to cause the database application to create the data in the instantiated configuration. In some embodiments, the first and second sets of metadata are retrieved from the SCM repository.

In step 555, the provisioned configuration is stored in a repository (e.g., file repository 140) as one of a plurality of configurations associated with a plurality of received change sets. In some embodiments, the provisioned configuration is stored as a package (e.g., a package 334) accessible for download. In some embodiments, a respective provisioned configuration of the database system is stored for each of the plurality of received change sets. In some embodiments, the provisioned configuration is stored in a repository that is distinct from the SCM repository. In some embodiments, method 530 further includes receiving, from a computing device (e.g., developer computing system 410), a request for a particular one of the plurality of configurations and executable program instructions of a change set associated with the particular configuration and providing, to the computing device, the particular requested configuration and the requested executable program instructions.

Figure 5C:
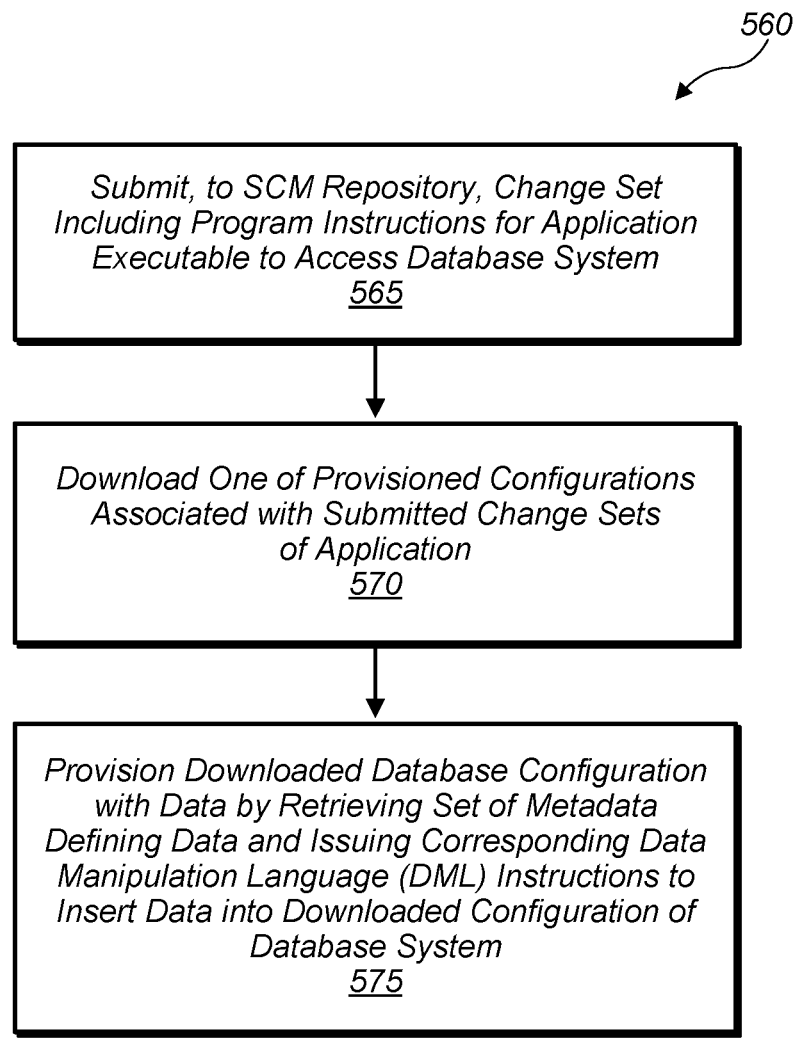

Turning now to FIG. 5C, a flow diagram of a method 560 for creating a configuration for a database system based on a submitted change set to a source code management (SCM) repository is depicted. In various embodiments, method 560 is performed by a first computing system such as developer computing system 410 discussed above.

In step 565, the first computing system submits, to the SCM repository (e.g., SCM repository 120), a change set (e.g., a change set 104) including program instructions (e.g., code 202) for an application (e.g., application 100) executable to access the database system. In various embodiments, the submitting causes a second computing system (e.g., executing build producer 130) to initiate a build process for the application that includes the second computing system provisioning the configuration (e.g., configuration 134) with a schema (e.g., schema 326) by using a first set of metadata (e.g., schema metadata 204) defining the schema to issue corresponding data definition language (DDL) instructions (e.g., DDL instructions 314) to create the schema in the configuration. In such an embodiment, the build process includes storing the provisioned configuration in a repository (e.g., repository 140) as one a plurality of provisioned configurations associated with submitted change sets including program instructions for the application.

In step 570, the first computing system downloads one of the plurality of provisioned configurations. In some embodiments, step 570 includes downloading a compressed package (e.g., configuration package 334A) including a configuration and expanding the compressed package to obtain an uncompressed version of the downloaded configuration. In some embodiments, the downloaded configuration is a test configuration corresponding to a production configuration associated with the application, and the test configuration includes less data than the production configuration. In some embodiments, the downloading includes downloading a database application (e.g., database application 422) executable to service requests to access the inserted data (e.g., data 328 or 428).

In step 575, the first computing system provisions the downloaded configuration with data (e.g., additional data 428) by retrieving a second set of metadata (e.g., metadata 402) defining data and issuing corresponding data manipulation language (DML) instructions (e.g., DML instructions 414) to insert the data into the downloaded configuration of the database system. In some embodiments, the build process includes the second computing system provisioning the configuration with seed data (e.g., seed data 328) by retrieving a third set of metadata (e.g., data metadata 206) defining the seed data and issuing corresponding DML instructions (e.g., DML instructions 316) to insert the data into the configuration.

Exemplary Computer System

Figure 6:
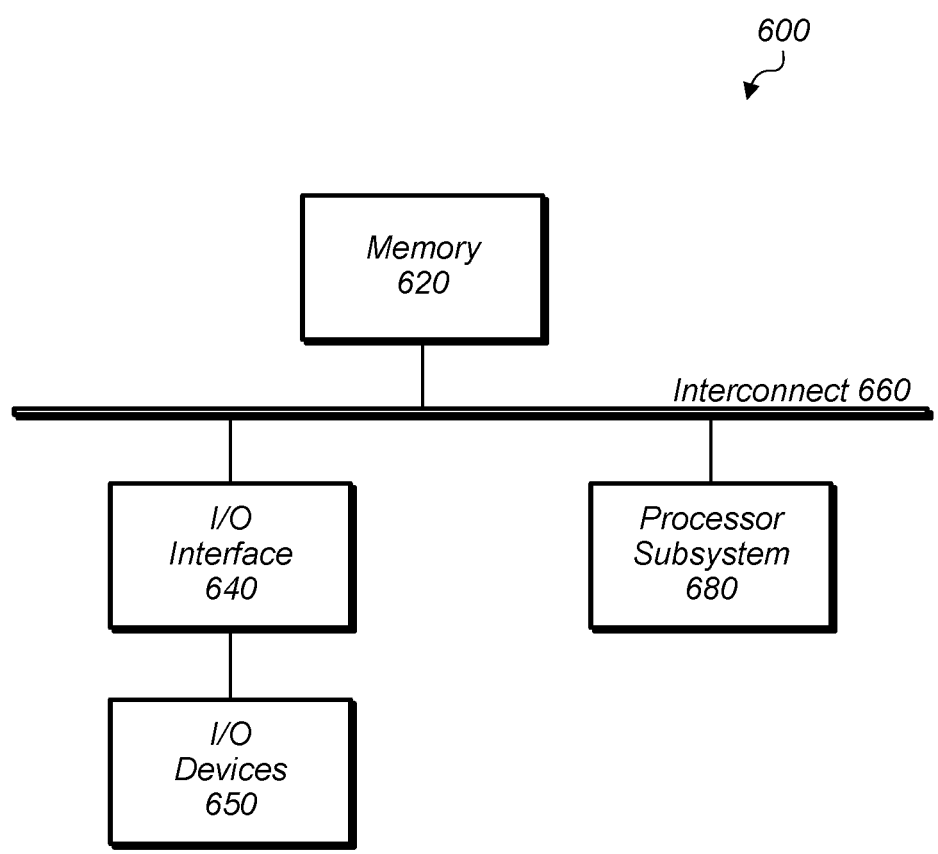
FIG. 6 is a block diagram illustrating one embodiment of an exemplary computer system.

Turning now to FIG. 6, a block diagram of an exemplary computer system 600, which may implement one or more computing systems executing elements of platform 10, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, system memory 620 may include program instructions for one or more of elements 110-140.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of creating a first configuration of a database system, wherein configurations of the database system differ based on source code management (SCM) change sets, a first type of metadata associated with a database schema, and a second type of metadata capable of causing a computer system to insert data into a configuration, the method comprising:
   for each of the SCM change sets received by a first computer system during an interval, provisioning, through use of the first computer system, a configuration of the database system by using the first type of metadata to issue data definition language instructions to create the configuration of the database system including the database schema defined by the first type of metadata;
   storing a plurality of the configurations so provisioned in a repository accessible to additional computer systems;
   downloading at least one of the configurations to one of the additional computer systems; and
   for the downloaded configuration, provisioning, at the additional computer system, the downloaded configuration of the database system with the data by using the second type of metadata to issue data manipulation language instructions to insert the data into the downloaded configuration to create the first configuration.

2. The method of claim 1, further comprising:
   during a build process of an application executable to access the database system, invoking, by the first computer system, a compiler to compile program instructions of a received change set to produce executable program instructions of the application, wherein the provisioning is performed during the build process of the application.

3. The method of claim 2, wherein the downloading includes:
   downloading the executable program instructions of the application.

4. The method of claim 2, wherein the provision includes using metadata defining a set of seed data to issue data manipulation language instructions to insert the set of seed data into the configuration of the database system.

5. The method of claim 1, wherein the provisioning includes:
   retrieving the first type of metadata from an SCM repository that includes the received SCM change sets;
   translating the first type of metadata into the data definition language instructions; and
   issuing the data definition language instructions to a database application executable to instantiate the database schema in the configuration.

6. The method of claim 1, wherein the plurality of configurations is stored in a plurality of compressed packages accessible to the additional computer systems.

7. A non-transitory computer readable medium having program instructions stored thereon that are capable of causing a computing system to implement operations to create a configuration for a database system during a build process of an application associated with the database system, the operations comprising:
   receiving, from a source code management (SCM) repository, program instructions of a change set for the application;
   in response to the receiving, performing the build process including:
      causing compilation of the received program instructions to produce program instructions executable to run the application;
      provisioning the configuration with a schema by retrieving a first set of metadata defining the schema and issuing corresponding data definition language (DDL) instructions to create the schema in the configuration;
      provisioning the configuration with data by retrieving a second set of metadata defining the data and issuing corresponding data manipulation language (DML) instructions to insert the data into the configuration; and
      storing the provisioned configuration in a repository as one of a plurality of configurations associated with a plurality of received change sets.

8. The computer readable medium of claim 7, wherein the operations comprise:
   receiving, from a computing device, a request for a particular one of the plurality of configurations and executable program instructions of a change set associated with the particular configuration; and
   providing, to the computing device, the particular requested configuration and the requested executable program instructions.

9. The computer readable medium of claim 7, wherein the operations comprise:
   storing the provisioned configuration as a package accessible for download.

10. The computer readable medium of claim 7, wherein the data defined by the second set of metadata is an initial set of seed data to be used by the application.

11. The computer readable medium of claim 7, wherein the build process includes:
   instructing a database application of the database system to instantiate an empty configuration.

12. The computer readable medium of claim 11, wherein provisioning the configuration with the schema includes:
   parsing the retrieved first set of metadata to identify one or more tables defined by the first set of metadata;
   determining a corresponding set of DDL instructions to create the one or more tables; and
   issuing the set of DDL to instructions to the database application to cause the database application to create the tables in the instantiated configuration.

13. The computer readable medium of claim 12, wherein provisioning the configuration with the data includes:
   reading a set of DML instructions from the second set of metadata; and
   issuing the set of DML instructions to the database application to cause the database application to create the data in the instantiated configuration.

14. The computer readable medium of claim 7, wherein the first and second sets of metadata are retrieved from the SCM repository, and wherein the provisioned configuration is stored in a repository that is distinct from the SCM repository.

15. The computer readable medium of claim 7, wherein the operations comprise:

storing a respective provisioned configuration of the database system for each of the plurality of received change sets.

16. A method of creating a configuration for a database system based on a submitted change set to a source code management (SCM) repository, the method comprising:

submitting, by a first computing system to the SCM repository, a change set including program instructions for an application executable to access the database system, wherein the submitting causes a second computing system to initiate a build process for the application that includes the second computing system provisioning the configuration with a schema by using a first set of metadata defining the schema to issue corresponding data definition language (DDL) instructions to create the schema in the configuration, wherein the build process includes storing the provisioned configuration in a repository as one of a plurality of provisioned configurations associated with submitted change sets including program instructions for the application;

downloading, by the first computing system, one of the plurality of provisioned configurations; and provisioning, by the first computing system, the downloaded configuration with data by retrieving a second set of metadata defining the data and issuing corresponding data manipulation language (DML) instructions to insert the data into the downloaded configuration of the database system.

17. The method of claim 16, wherein the downloading includes:

downloading a compressed package including a configuration; and expanding the compressed package to obtain an uncompressed version of the downloaded configuration.

18. The method of claim 16, wherein the build process includes the second computing system provisioning the configuration with seed data by retrieving a third set of metadata defining the seed data and issuing corresponding DML instructions to insert the data into the configuration.

19. The method of claim 18, wherein the downloaded configuration is a test configuration corresponding to a production configuration associated with the application, wherein the test configuration includes less data than the production configuration.

20. The method of claim 16, wherein the downloading includes downloading a database application executable to service requests to access the inserted data.

* * * * *